Jan. 3, 1967  C. D. FIERO ET AL  3,296,358
STRUT-SUSPENSION CONDUCTOR SUPPORT
Filed July 9, 1964  4 Sheets-Sheet 1

INVENTORS.
CARL D. FIERO
STANLEY C. KILLIAN
BY
*Cumpston + Shaw*
THEIR ATTORNEYS.

INVENTORS.
CARL D. FIERO
STANLEY C. KILLIAN
BY *Ampston + Shaw*
THEIR ATTORNEYS.

INVENTORS.
CARL D. FIERO
STANLEY C. KILLIAN

United States Patent Office 3,296,358
Patented Jan. 3, 1967

3,296,358
STRUT-SUSPENSION CONDUCTOR SUPPORT
Carl D. Fiero and Stanley C. Killian, Le Roy, N.Y., assignors to Lapp Insulator Co., Inc., Rochester, N.Y., a corporation of New York
Filed July 9, 1964, Ser. No. 381,317
10 Claims. (Cl. 174—43)

This invention relates to a strut-suspension conductor support, and more particularly to an improved device for supporting either a single or "bundle" conductors in cooperation with a strut insulator in an electric power transmission system.

Strut-suspension conductor supports, generally, are well known. U.S. Patent 3,002,043, issued on September 26, 1961 to Ralph L. Jenner and Simpson B. Mills shows an electric power transmission system using strut insulators extending generally laterally from a support tower or from a member connected to a support tower for laterally positioning an electric power conductor that is otherwise vertically supported. As disclosed in such patent, strut insulators are particularly advantageous in positioning or locating conductors suspended from jointed suspension string insulators that are dependent from a support structure. In a typical suspension string insulator, a number of insulating elements are connected one above the other by movable connecting means to form a jointed string of suspended insulator elements operating in tension, but not in compression, in supporting a line conductor. A strut insulator cooperating with a suspension string and capable of resisting stresses of either compression or tension is arranged for maintaining the line conductor in a predetermined position or within a controlled range of positions and separated by a predetermined insulating spacing from a pole, tower, or other supporting structure. One of the advantages of a strut type conductor supporting system is the maintenance of minimum insulating clearance of the line conductor from the supporting structure.

Higher power line voltages have led to increasing use of strut insulators for positioning suspended conductors, and there has been a tendency toward longer strut insulators for such purposes. In addition, power transmission systems increasingly use "bundle" conductors or a plurality of spaced conductors carrying the same potential, and such bundle conductors place different and sometimes larger stresses upon the supporting insulators.

The known types of ceramic material of which electric power line insulators are made can withstand great tensile and compressive stress, but cannot withstand large bending, transverse, or torsional stress. Moreover, line conductors in an electric power transmission system can subject supporting insulators to a variety of stresses, and particularly the strut and suspension insulators supporting a plurality of spaced bundle conductors can be twisted and pulled in a variety of directions. For example, one or more conductors on one side of an insulator support point can break, ice formed on line conductors can drop off on one side of an insulator support point and not on the other, and any of these conditions can be combined with high winds. It has been found, particularly with bundle conductors, that such stresses damage insulators and conductors and cause power failures when previously known strut-suspension supports are used. One specific weakness of such previous supports was that they allowed conductors under unusual stress to apply transverse and torsional stresses to strut insulators thus breaking the struts and allowing the conductors to move from their laterally maintained positions into relative proximity or contact with the support tower.

It is an object of the invention to support power line conductors in part by a strut insulator that is arranged so as to be free of transverse and torsional stresses and to be subject only to tensile and compressive stresses.

Another object of the invention is to support power lines conductors by a plurality of insulators arranged so that forces acting on the conductors do not damage the insulators or supporting structure.

Another object of the invention is to support one or more conductors jointly by a suspension and a strut insulator that are arranged to have utmost resistance to damage from winds, ice formations, and conductor breakage.

Another object of the invention is to achieve maximum economy in maintaining line conductors within narrow limits of positional stability.

To these and other ends the invention resides in certain improvements and combinations of parts, all as will be hereinafter more fully described, the novel features being pointed out in the claims at the end of this specification.

Generally, the invention resides in supporting line conductors jointly by a suspension and a strut insulator in cooperation with means allowing relative movement between parts such that the substantially rigid, ceramic, strut insulator is not subjected to transverse or torsional stresses even under severe wind, ice, and line breakage conditions.

The invention is applicable to the support of a single line conductor or bundle conductors, and will be described relative to a single and a two-conductor power transmission system, although it will be understood that the invention is applicable to the support of three or more conductors as well.

Figure 1:
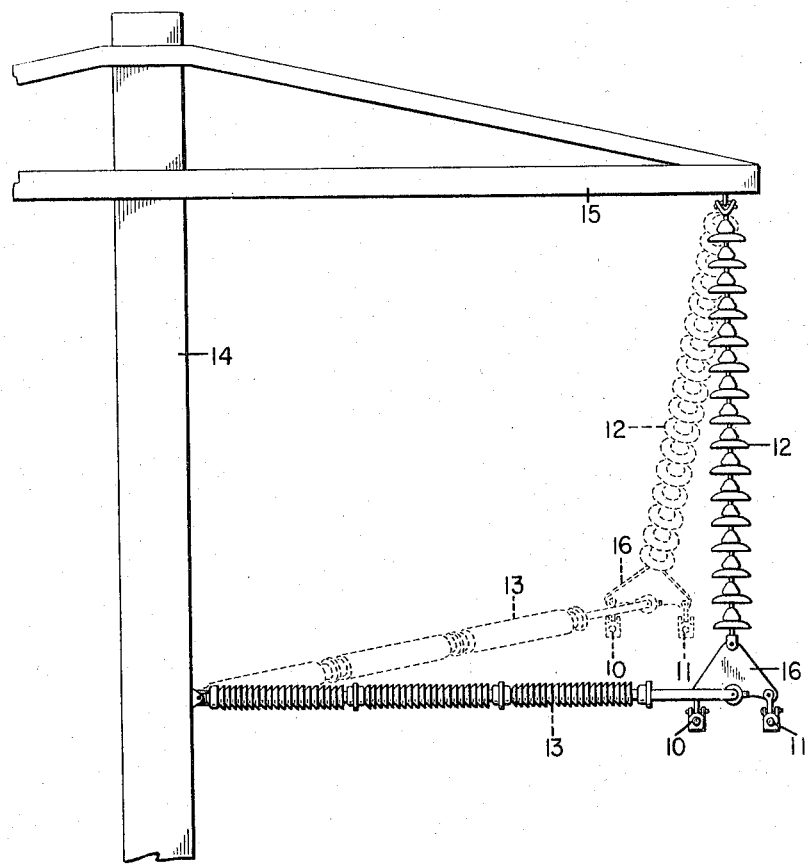
FIG. 1 shows a side elevation of a suspension string and strut insulator support for a pair of spaced line conductors according to the invention.

FIG. 1 shows a typical supporting of a pair of spaced line conductors 10 and 11 by a suspension string insulator 12 and a strut insulator 13 according to the invention. As shown in U.S. Patent 3,002,043, many alternatives of strut insulator arrangement are available in addition to the one selected merely for illustration in the drawings, but such alternatives are incidental to the invention which can be applied to any of them. Throughout the specification and claims reference is made to "support tower," "supporting tower," etc. which terms are intended to include any tower or pole structure arranged to uphold conductors. Any cross arm, brace or other member connected to such a tower is also included within the intended meaning of such terms, and within the spirit of the invention, insulators "dependent from" or "extending from" a tower can be connected to any element, member, brace, bracket, leg, etc. of a tower.

Figure 2:
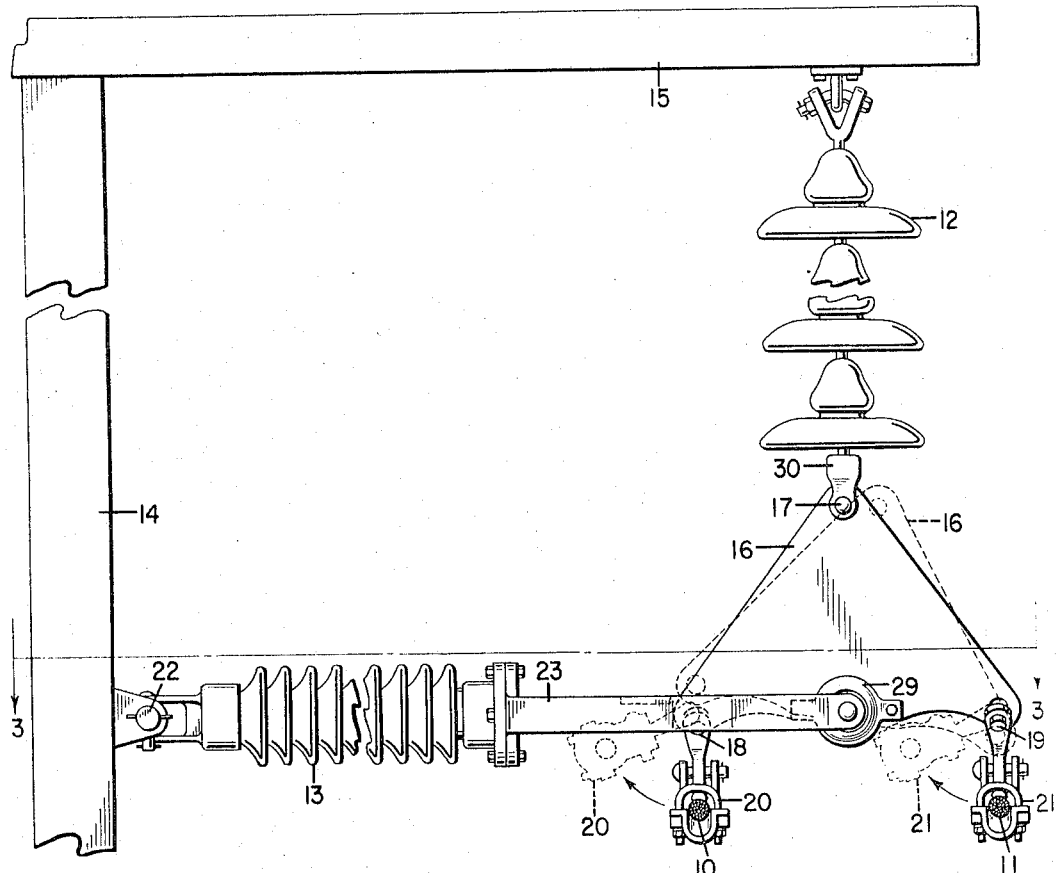
FIG. 2 shows a side elevation of a support for a pair of conductors according to the invention.
Figure 3:
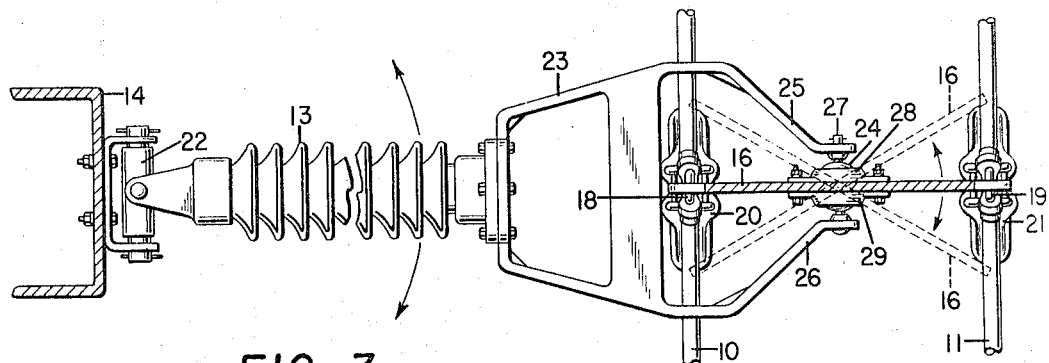
FIG. 3 shows a top view of a cross section of the structure of FIG. 2 taken along the line 3—3.
Figure 4:
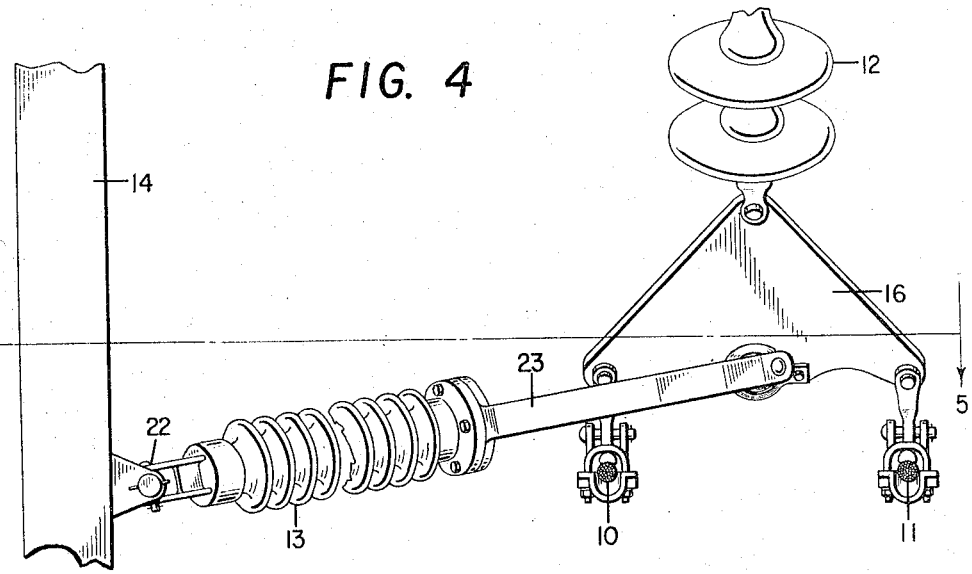
FIG. 4 shows a side elevation of the inventive support as placed under stress.
Figure 5:
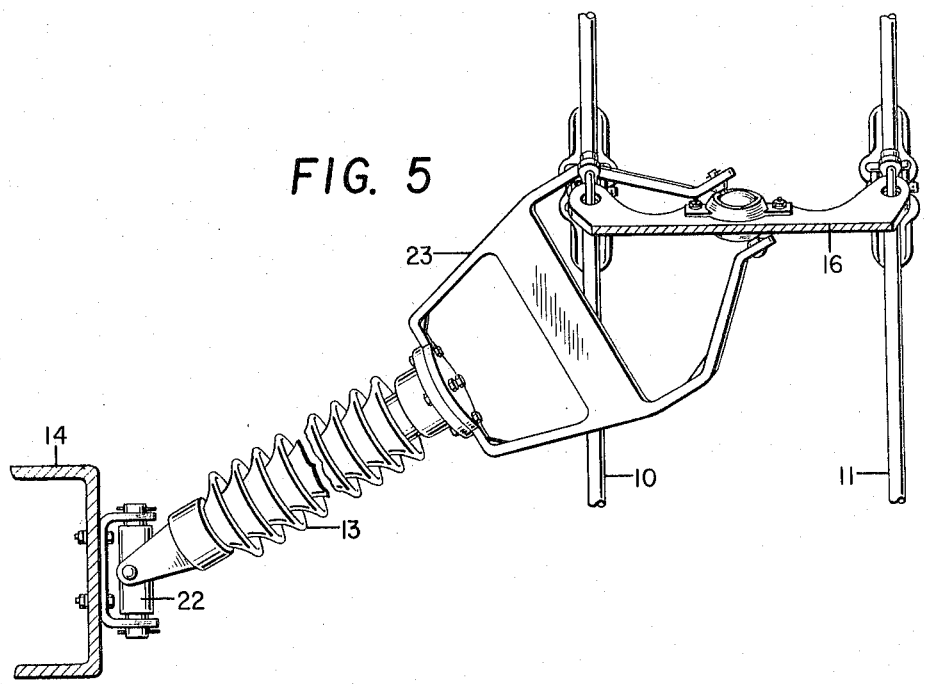
FIG. 5 shows a top view of a cross section of the view of FIG. 4 taken along the line 5—5.

Strut insulator 13 extends generally laterally from a support structure or tower 14, including of course from a cross arm or other member fixed to tower 14, and suspension string 12, formed of joined insulator segments is dependent from a laterally extending arm 15 or cross arm of support tower 14. The broken-line position of strut 13, suspension string 12, and conductors 10 and 11 as shown in FIG. 1 represents one of many movements of the assembly in response to forces acting upon conductors 10 and 11, and particularly shows a strong pull on line conductors 10 and 11 in a down-line direction as illustrated in FIG. 1. Such a pull could be produced by parting of conductors 10 and 11 in the foreground between the viewer and the illustration of FIG. 1 or ice dropping off conductors 10 and 11 in the viewer's foreground and heavy ice formations remaining on conductors 10 and 11 down-line beyond the support structure illustrated in FIG. 1. FIGS. 4 and 5 show enlarged and more detailed views of the broken-line position of the support structure of FIG. 1. FIGS. 2 and 3 show enlarged and more detailed views of the solid line position illustrated in FIG. 1.

In FIGS. 1–5 the components of the supporting structure include conductors 10 and 11, strut insulator 13, suspension string insulator 12, and supporting tower 14 with lateral or cross arm 15. A yoke plate 16 is movably dependent from the bottom of the suspension string 12 as by a pivotal clevis or coupler 30 supporting a pin 17 passing through an aperture in the top of yoke plate 16, as best shown in FIG. 2. Line conductors 10 and 11 are movably dependent from yoke plate 16 by a conventional, respective arrangement of pins 18 and 19 and clamps 20 and 21.

Strut insulator 13 is connected to supporting tower 14 either directly or through an intermediate member fixed to tower 14 by a universal joint 22 that allows strut movement both horizontally and vertically. A bifurcated clevis 23 is fixed to the outer end of strut insulator 13 and is the connecting link between strut insulator 13 and yoke plate 16. A ball 24 is mounted between legs 25 and 26 at the outer end of clevis 23 by means of a pin 27. A pair of plates 28 and 29 fastened to opposite sides of yoke plate 16 from a socket or partial socket closely fitting ball 24 so as to couple clevis 23 to yoke plate 16 and to allow a range of movement in any direction of yoke plate 16 around ball 24 and relative to clevis 23.

As shown in FIG. 2, conductors 10 and 11 and their associated clamps 20 and 21 can move toward tower 14 relative to yoke plate 16 and clevis 23 to their broken-line positions, and can also move away from tower 14 to corresponding broken-line positions not shown. Such swinging motion can be caused by extremely high wind, and the dependent clamps, yoke plate, and clevis arrangement allows conductors 10 and 11 to be forced sideways and upward in response to high winds for an amount sufficient to accommodate wind velocities which the rest of the transmission system can withstand. High winds blowing conductors 10 and 11 to their broken-line position as illustrated in FIG. 2 cause a slight pivoting of yoke plate 16 to its illustrated broken-line position. Such pivoting of yoke plate 16 is not transmitted to strut 13 because of the relative movement permitted by the ball and socket connection between clevis 23 and yoke plate 16. For winds causing movement of conductors 10 and 11 toward their broken-line positions as illustrated in FIG. 2, strut insulator 13 is subjected to compression stress, and for winds of an opposite direction, strut insulator 13 is subjected to tensile stress. Winds from various intermediate directions can produce some up and down line motion of the conductor supporting means, but the universal joint 22 connecting strut insulator 13 and tower 14 allows for such motion of strut 13 so as to relieve it from transverse and torsional stresses regardless of the direction of winds.

As shown in FIG. 3, yoke plate 16 can accommodate longitudinal motion of conductors 10 and 11 relative to one another by twisting about ball 24 connected to clevis 23. Broken-line positions for yoke plate 16 illustrate the twisting motion which is permitted by the ball and socket connection between clevis 23 and yoke plate 16 and which is thus not transmitted to strut insulator 13. Twisting of yoke plate 16 relative to suspension string 12 is provided for by the well-known pivotal coupling of connector 30 to the last element of the suspension string 12. Also, each element of a suspension string as normally connected is pivotable relative to the next.

The twisting of yoke plate 16 relative to clevis 23 as illustrated in FIG. 3 can be accompanied by an up or down-line motion of strut insulator 13 and can be caused by several conditions such as uneven loading of conductors 10 and 11 from breaking or parting of one of the conductors or from uneven dropping of ice from conductors 10 and 11.

The views of FIGS. 4 and 5 show in more detail the effect of an extraordinary down-line stress on conductors 10 and 11 moving the supporting means down-line and in the direction of the stress. Such a movement can be caused by breaking of both conductors 10 and 11 in the foreground between the viewer and the view of FIG. 4. Under such conditions, strut insulator 13 is subjected to tensile stress and is moved or swung down-line and slightly raised. Universal joint 22 allows such horizontal and vertical motions of strut insulator 13. Yoke plate 16 is canted over and twisted relative to clevis 23, and such relative motions are permitted by the ball and socket joint between yoke plate 16 and clevis 23. Since the ball and socket joint between yoke plate 16, clevis 23 and the universal joint 22 between strut insulator 13 and tower member 14 allow for the illustrated relative motions from stresses or forces acting on conductors 10 and 11, strut insulator 13 is relieved of transverse and torsional stresses and is subjected only to tensile stress in the views of FIGS. 4 and 5.

Figure 6:
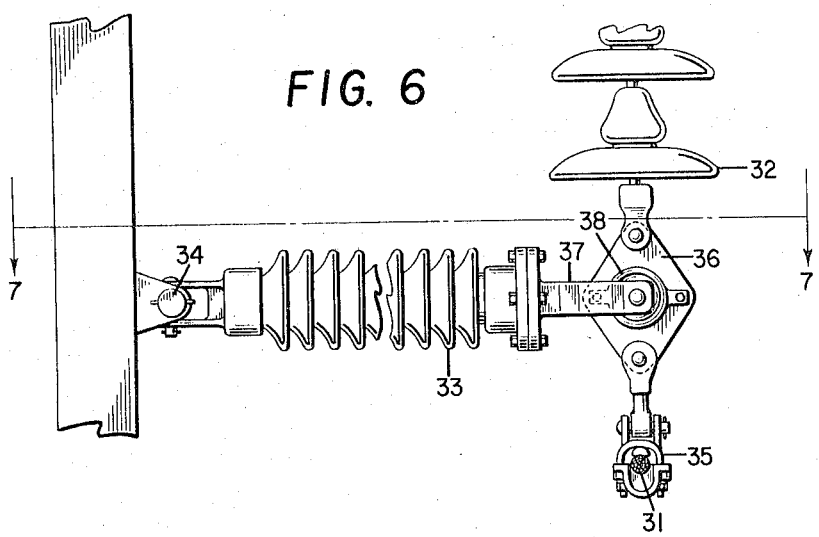
FIG. 6 shows a side elevation of a support for a single line conductor according to the invention.
Figure 7:
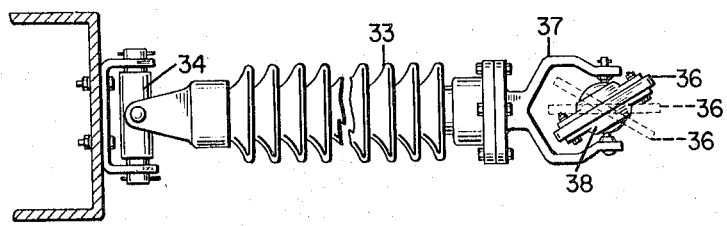
FIG. 7 shows a top view of a cross section of the view of FIG. 6 taken along the lines 7—7.

As shown in FIGS. 6 and 7, the supporting structure of the invention is applicable also to support of a single line conductor 31. Suspension string 32 and strut insulator 33 cooperate in the same way as described above for FIGS. 1–5 in supporting conductor 31 which is dependent from support plate 36 by a conventional clamp 35. Suspension string 32 is dependent from a supporting structure, and strut insulator 33 extends laterally from a supporting structure as described above. A universal joint 34 connects strut insulator 33 to the supporting structure, and a clevis 37 fixed to the outer end of strut insulator 33 is connected to plate 36 by means of a ball and socket joint 38 in the same way that the above described clevis 23 is connected to yoke plate 16.

In response to high winds, conductor 31 and clamp 35 can swing relative to plate 36 without subjecting strut insulator 33 to other than tensile or compressive stress. Plate 36 is pivotal relative to clevis 37, and in response to uneven loading of conductor 31 as from ice or breakage, strut insulator 33 can swing up and down and longitudinally of the line as permitted by universal joint 34. Thus, in ways similar to those described above relative to FIGS. 1–5, the single conductor support structure of FIGS. 6 and 7 adjusts to severe or unusual forces on conductor 31 without subjecting strut insulator 33 to transverse or torsional stresses.

It will thus be seen that by the simple, economic, and reliable supporting structure of the illustrated preferred embodiment, one or more line conductors can be supported within a narrow range of positions so as to maintain conductors in an insulated relation to a supporting structure and yet support the conductors against unusual forces as from high winds, and uneven loading from ice or conductor breakage. The advantages of the invention include protection of the insulators and supporting structures from damage caused by unusual forces on the line conductors. Also, the conductors are maintained a minimum insulating distance from a supporting structure so as to carry high voltages during wind or ice storms. These advantages of the invention are accompanied by simplicity, economy, strength, light weight, and reliability of the supporting structure so that such advantages are obtained without proportional expense.

While the invention has been disclosed herein by reference to the details of preferred embodiments, it is to be understood that such disclosure is intended in an illustrative, rather than a limiting sense, and it is contemplated that various modifications of the construction and arrangement of the parts will readily occur to those skilled in the art, within the spirit of the invention and the scope of the appended claims.

We claim:

1. In an electrical high voltage power transmission system including spaced apart support towers, a suspension insulator pendant from said tower, and a rigid, strut insulator disposed generally horizontally from said tower, improved means for movably supporting a plurality of spaced conductors jointly by said suspension and strut insulators, said supporting means comprising:
    (a) yoke means;
    (b) means movably connected to said yoke means in the top region thereof for movably coupling said yoke means to the bottom of said suspension insulator;
    (c) means for movably suspending said conductors in spaced apart relation from the bottom region of said yoke means; and
    (d) ball and socket joint means for connecting the outer end of said strut insulator to said yoke means in the bottom region thereof.

2. The structure of claim 1 including universal joint means for connecting the inner end of said strut insulator to said tower.

3. The structure of claim 1 wherein said ball and socket joint means comprise a ball rotatably seated in a ball-retaining, socket structure carried by said yoke means, and substantially rigid means secured to said ball and to said outer end of said strut insulator.

4. The structure of claim 3 wherein said substantially rigid means comprises a clevis fastened to said outer end of said strut insulator with the legs of said clevis straddling said poke means, and means fastening the ends of said legs to said ball.

5. The structure of claim 4 including universal joint means connecting the inner end of said strut to said tower.

6. The structure of claim 1 wherein said means movably connected to said yoke means in the top region thereof comprises a clevis straddling said yoke means and a pin extending between the legs of said clevis through an aperture in said top region of said yoke means.

7. The structure of claim 1 wherein said yoke means comprises a plate having an aperture in said top region and a pair of spaced apart apertures in said bottom region on opposite sides of said ball and socket joint means, and said means movably connected to said yoke means in said top region thereof comprises a clevis straddling said yoke plate and a pin extending between the legs of said clevis through said aperture in said top region, and said means for movably suspending said conductors comprises clevis means straddling said yoke plate and pins extending between the legs of said clevis means through apertures in said bottom region.

8. In an electrical high voltage power transmission system including spaced apart, upright support towers, a generally vertically disposed, suspension string insulator pendant from each of said towers, and a rigid strut insulator disposed generally horizontally from each of said towers, improved means for movably supporting a pair of spaced apart bundle conductors jointly by said suspension and strut insulators, said supporting means comprising:
    (a) a yoke plate;
    (b) a means movably connected to said yoke plate in the top region thereof for movably coupling said yoke plate to the bottom of said suspension string insulator;
    (c) means for movably suspending each of said conductors in spaced apart relation from the bottom region of said yoke plate;
    (d) ball and socket joint means for connecting the outer end of said strut insulator to said yoke plate in the bottom region thereof; and
    (e) universal joint means for connecting the inner end of said strut insulator to said tower.

9. The device of claim 8 wherein said ball and socket joint means comprises a ball rotatably seated in the socket of a ball-retaining, socket-forming structure carried by said yoke plate, a clevis fastened to said outer end of said strut insulator with the legs of said clevis straddling said yoke plate, and substantially rigid means fastening the ends of said legs to said ball.

10. The device of claim 9 wherein said yoke plate is formed to define an aperture in said upper region and a pair of spaced apart apertures in said lower region disposed on opposite sides of said socket-forming structure, and clevis means having a pin extending through said aperture in said upper region connects said yoke plate to the bottom of said suspension string insulator, and clevis means having pins extending through said apertures in said bottom region of said yoke plate supports said conductors.

References Cited by the Examiner

UNITED STATES PATENTS

| | | | |
|---|---|---|---|
| 1,253,919 | 1/1918 | Williams | 287—138 |
| 2,308,613 | 1/1943 | LeTourneau | 287—88 |
| 2,587,587 | 3/1952 | Bellezza et al. | 174—14 |
| 2,766,079 | 10/1956 | Browne. | |
| 3,002,043 | 9/1961 | Jenner et al. | 174—40 |

OTHER REFERENCES

Electrical World, vol. 150, No. 15, Oct. 13, 1958, TK–1.E6.

Electrical World, vol. 159, No. 8, Feb. 25, 1963: TK–1.E6, p. 116, General Electric Ad.

LEWIS H. MYERS, *Primary Examiner.*

LARAMIE E. ASKIN, *Examiner.*

R. F. RUGGIERO, *Assistant Examiner.*